United States Patent [19]

Marino et al.

[11] 4,238,794
[45] Dec. 9, 1980

[54] MATCHING CIRCUITRY FOR USE WITH A RADAR STATION AND A TELEVISION MAGNETOSCOPE

[75] Inventors: Paul J. Marino; Jean Blanchard; Gerard R. Stefanini, all of Toulon, France

[73] Assignee: Etat Francais as represented by the delegue general pour l'armement, Paris, France

[21] Appl. No.: 17,325

[22] Filed: Mar. 5, 1979

[30] Foreign Application Priority Data

Dec. 12, 1978 [FR] France .................................. 78 34852

[51] Int. Cl.³ .............................................. G01S 13/00
[52] U.S. Cl. ..................................... 343/5 PC; 360/27
[58] Field of Search ........................ 360/27; 343/5 PC

[56] References Cited

U.S. PATENT DOCUMENTS

| | | | |
|---|---|---|---|
| 3,710,380 | 1/1973 | Bouman et al. ................... | 343/5 PC |
| 3,725,912 | 4/1973 | Buchholz et al. ................. | 343/5 PC |
| 3,833,934 | 9/1974 | Roark ................................ | 343/5 PC |
| 3,840,874 | 10/1974 | Dawson et al. ................... | 343/5 PC |
| 3,849,776 | 11/1974 | Lain .................................. | 343/5 PC |
| 4,047,170 | 9/1977 | Miller ............................... | 343/5 PC |

Primary Examiner—Stephen C. Buczinski
Attorney, Agent, or Firm—Stevens, Davis, Miller & Mosher

[57] ABSTRACT

The invention provides matching circuitry for use with a radar station and a television magnetoscope, the latter having a video channel and an audio channel. The matching circuitry enables the audio channel of the magnetoscope to be used for information concerning the instantaneous position of the antenna of the radar station, and the video channel for video and synchronizing signals. An oscillator isused to supply artificial frame pulses to a control track of the video channel of the magnetoscope. The recordings of these pulses are used to synchronize the video reading head of the magnetoscope when the information is being retrieved or reproduced from the magnetoscope.

20 Claims, 17 Drawing Figures

MATCHING CIRCUITRY FOR USE WITH A RADAR STATION AND A TELEVISION MAGNETOSCOPE

BACKGROUND OF THE INVENTION

The present invention relates to the recordal on a television magnetoscope of information transmitted by radar, and the retrieval or reproduction of the recorded information.

The technical field of the invention is that of the construction of electronic information recording and retrieval or reproduction circuits.

The definitions of the terms employed and the references concerning radar apparatus and television magnetoscopes are given in the description with reference to FIGS. 1 to 3.

Certain information emitted by a radar station has already been stored.

For example, some radar stations are associated with a computer and some of the information extracted by an extractor are converted into digital values and recorded in a peripheral memory of the computer. This method is obviously very costly.

SUMMARY OF THE INVENTION

An object of the present invention is to be able to record on a television magnetoscope all the information emitted by a radar station by recording the video signal in analog form and the other signals in an analog or encoded form, without having to modify the magnetoscope.

Recording on a television magnetoscope makes it possible to utilise mass produced magnetoscopes which are commercially obtainable at a very much lower cost than recording circuits specially manufactured for recording the information transmitted by a radar unit.

The object of the invention is achieved by means of recording on the one hand the information regarding the angular position of the antenna of the radar station on that one of the two tracks of the magnetoscope which is used to record the sound in television, while on the other hand the video signals and the synchronising pulses of the radar station are recorded on that track of the magnetoscope which is intended for the recording of the video signals and of the line and frame synchronising pulses of the television.

According to one aspect of the invention there is provided matching circuitry for use with a radar station and a television magnetoscope, the latter having a video channel and an audio channel, the matching circuitry being operable to supply to and retrieve from said television magnetoscope information provided by said radar station, and said matching circuitry comprising:

first means for supplying to said audio channel of said television magnetoscope information regarding the angular position of an antenna of said radar station;

second means for supplying to said video channel of said television magnetoscope video signals and synchronising signals from said radar station;

an oscillator for supplying for said video channel pulses having duration and frequency substantially equal to television frame pulses;

mixing means for mixing said pulses T for said video channel with said video signals and said synchronising signals so that said pulses T will be recorded on a control track of said magnetoscope, said control track being intended for the recording of said television frame pulses, whereby said pulses T are employed during retrieval of said information from said magnetoscope for synchronising the speed of travel of a tape of said magnetoscope with the speed of revolution of a video signal reading head thereof;

first retrieval means for retrieving said information from said video channel of said television magnetoscope;

suppression means in said first retrieval means for suppressing said pulses T in the retrieval of said information; and second retrieval means for retrieving said information from said audio channel of said television magnetoscope.

In accordance with preferred development, means are provided to enable the matching circuitry to operate in accordance with the following stages:

The angular position of the antenna in relation to a fixed reference direction is recorded in the form of pulses N corresponding to the passages of the antenna through a reference direction, on the one hand, and in the form of pulses $\theta$ the number of which succeeding each pulse N is proportional at any instant to the angle of the antenna to the said reference direction; on the other hand;

the said pulses N and $\theta$ are encoded in the form of pulse trains comprising respectively two different numbers n and n' of pulses; and during the retrieval or reproduction of the recording, the pulses N and $\theta$ are identified by comparing the number of pulses succeeding one another in a limited time with two reference numbers equal to n and n' respectively;

the number of pulses $\theta$ are counted, starting from each pulse N; and the number of pulses $\theta$ is converted into three three-phase voltages, which define at any instant an angle equal to the angle of the antenna to the reference direction.

In a pulse coding method, the stages may be the following:

the radar synchronising pulses are converted into trains of a number m of successive pulses;

the said pulse trains and the pulses T are mixed with the video signals with a negative amplitude before the multiplexed signals are recorded; and in the retrieval or reproduction of the recorded signals, the radar video signals are detected by suppressing all the negative signals; and the radar synchronising pulses are detected by comparing the number of successive pulses succeeding one another in a limited time with a number m' lower than or equal to m.

It is possible to record on the video track of a television magnetoscope the radar video and synchronising pulses and on an audio track of the said magnetoscope the angular position of the antenna of the radar station in relation to a fixed reference direction, which position is represented in analog form by voltages emitted by a synchroreceiver forming part of the radar station.

Such a device comprises matching circuits interposed between the radar station and the magnetoscope, which circuits may comprise:

circuits for mixing with the radar video signals, simultaneously, negative pulses L' synchronous with the said radar synchronising pulses having a duration of 6 μs equal to the duration of television line synchronising pulses, and negative pulses T' having a duration of 120 μs equal to the duration of television frame pulses, the said pulses T' being generated by means of an oscillator having a frequency of 50 or 60 Hz equal to the standardised frequency of television frame pulses, which circuits are connected to the video input terminal of the magnetoscope;

a synchro-digital convertor for converting the voltages emitted by the said synchroreceiver into digital values proportional at any instant to the angular position of the antenna in relation to the said reference direction;

circuits which are connected to the two extreme output terminals $2°$, $2^{-n}$ of the said synchro-digital convertor and which generate on the one hand a pulse N corresponding to each passage of the antenna through the said reference direction and on the other hand pulses $\theta$ of which the number succeeding each pulse N is proportional at any instant to the said angular position of the antenna, which circuits are connected to the audio input terminal of the magnetoscope.

Such an apparatus may comprise in addition matching circuits interposed between the outputs of the magnetoscope and the circuits for the utilisation of the radar information, which circuits may comprise;

circuits connected to that output terminal of the magnetoscope which corresponds to the head for the reading of the video signals, the said circuits comprising on the one hand means for eliminating all the negative signals so as to separate the video signals, and on the other hand means for eliminating the video signals and the said pulses T' so as to supply only pulses L, and means for generating from the said pulses L radar synchronising pulses having a duration of the order of 1 μs;

circuits connected to that output terminal of the magnetoscope which corresponds to an audio reading head, the said circuits comprising circuits for separating the said pulses N and $\theta$, a binary pulse counter whose resetting terminal is connected to the output of the said circuits which supply the pulses N and whose input is connected to the output of the said circuits which supply the pulses $\theta$ and a digital-synchro convertor which supplies three-phase pulses which define at any instant an angle equal to the angular position of the antenna in relation to the said fixed reference direction.

The invention affords inter alia the recording of all the information transmitted by a radar station on a commercially obtainable television magnetoscope without the latter having to be modified.

This mode of recording radar information is of considerable practical use in many cases.

In the case of radar stations situated in a control tower of an aerodrome, it makes it possible to keep in store the image of the traffic during a certain time and thereafter to display this image on a radar screen, if necessary causing it to appear a number of times, for example in the case of an accident in order to establish the exact circumstances of the latter.

The recording of the radar images makes it possible to form and to train radar operators by projecting to them in delayed time the recorded images of real and characteristic situations. It also makes it possible to build up a library of recordings of particular phenomena, for example sea clutter and thereafter to use these recordings at a later time in order to set up particular circuits for the suppression or correction of these phenomena and to test the efficacy of the said circuits.

By means of the recording of radar information on television magnetoscopes, which are mass-produced apparatuses which can record a number of hours of transmission on each reel, it is possible to record at a relatively moderate cost a number of hours of radar observation, to keep these indefinitely and to pass them to the various utilisation circuits as often as is desired.

The methods and apparatus described hereinafter make it possible to record and to obtain on reading all the information supplied by a radar station and they therefore make it possible to supply all the utilisation and visual display apparatus at present used in real time in order to utilise the information transmitted by a radar station. Experience has shown that the quality of the information obtained is very satisfactory and is sufficient to operate in delayed time all the utilisation apparatus, that is to say, the apparatus for the visual display and/or extraction thereof.

One application of the apparatus according to the invention is to provide devices of the type described in the foregoing which are slightly modified to permit not only the recording of radar signals on a television magnetoscope having only two input channels, but also to permit the transmission of the radar signals over existing transmission systems which are used to transmit television signals, notably over radio systems.

It will be recalled that the existing networks for the transmission of television programmes either by cable or by radio systems comprise two channels. A first channel, called the picture channel, carries multiplexed video-frequency signals comprising both the picture signals and the frame and line synchronising pulses. The second channel, called the sound channel, receives and carries the audio-frequency signals.

The multiplexed signals which are carried over the picture channel of the transmission networks, notably existing radio systems, must be constantly positive in order that the transmission may be correct.

The present specification therefore also relates to a novel application of the above-described circuits comprising on the one hand matching circuits disposed between the output of a radar station and a television magnetoscope having only two inputs, and on the other hand matching circuits which are disposed between a megnetoscope and the usual radar signal processing apparatus.

Accordingly, these same circuits are used to carry the signals transmitted by a radar station over a television transmission network having a picture channel and a sound channel, and in this case a matching circuit is interposed between the radar station and the transmitting station of the network and a matching circuit is interposed between the receiving station of the network and radar signal processing apparatus remote from the radar station.

In order to make the multiplexed video signals compatible with the picture channel of the television transmission network, the matching circuits comprise means for raising the mean level of the multiplexed signals, so that these signals are constantly positive.

The means for raising the mean level consist, for example, of a decoupling capacitor and of an adjustable voltage divider by means of which there can be added to the signals a positive d.c. bias voltage.

The result of this improvement described in the foregoing is that the signals leaving the matching circuits can be recorded on a local television magnetoscope, and/or transmitted to a distance over an existing television network.

At the receiving station of the network, they can be recorded on a television magnetoscope and/or retrieved or reproduced by a retrieval or reproduction matching circuit and processed on conventional equipment, remote from the radar station, for the processing of the radar signals.

It is also possible to process in delayed time on equipment for the processing of the radar signals information which is recorded in real time on a local magnetoscope and then transmitted in delayed time over a transmission network or information which is transmitted in real time over a transmission network and recorded on a magnetoscope situated remote from the radar station.

All these possibilities of processing radar signals, either on local conventional equipment, in delayed time, or on processing equipment remote from the radar station in real time, or in delayed time, are obtained by virtue of a minimum modification of the recording matching devices described in the foregoing, the retrieval or reproduction matching circuits remaining unchanged.

Apart from these recording and reproduction matching circuits, there are used only existing television magnetoscopes which are commercially obtainable at a cost distinctly lower than that of recorders designed specially to record the radar signals and the existing networks for the transmission of television programmes, which are generally unused during certain hours of the day.

BRIEF DESCRIPTION OF THE DRAWINGS

For a better understanding of the invention and to show how it may be put into effect reference will now be made, by way of example to the accompanying drawings in which:

FIGS. 4 and 6 are respectively a synoptic diagram and a developed diagram of the circuits for the recording of the video and synchro-radar signals by pulse coding, and FIG. 5 is a curve diagram illustrating the pulses as a function of time;

FIGS. 7 and 9 are respectively a synoptic diagram and a developing diagram of the pulse reading of the video and synchronising signals by pulse coding and FIG. 8 is a diagram of the pulses as a function of time;

FIGS. 10 and 11 are respectively a synoptic diagram and a developed diagram of the circuits for the recording of the angular position of the antenna of the radar station by pulse coding, and FIG. 12 is a curve diagram of the pulses as a function of time;

FIG. 13 is a synoptic diagram of the circuits for the reading of the angular position of the antenna by pulse coding and FIG. 14 is a curve diagram of the pulses as a function of time;

DETAILED DESCRIPTION OF THE DRAWINGS

Figure 1:
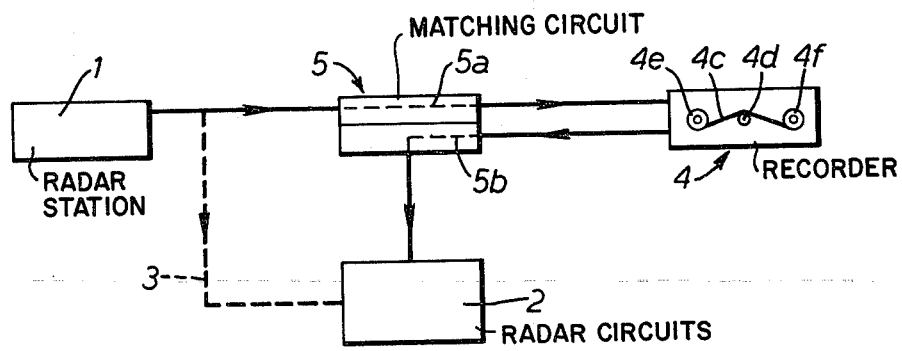
FIG. 1 is a general block diagram of a radar recording and display system comprising matching circuitry according to the invention.

FIG. 1 shows at 1 a radar station of any suitable known type and at 2 circuits for the utilisation of the radar signal. The chain-lined link 3 represents the usual utilisation path of the radar signals, which are employed in real time in the circuits 2.

The radar station 1 conventionally comprises an antenna (not shown) which usually rotates at uniform speed, of the order of a few revolutions per second, and in this case it transmits a first item of information which is the azimuth of the antenna taken in relation to a fixed reference direction, which is generally the North. For this purpose, the axis of rotation of the antenna of the radar station 1 is associated with a device (not shown) for the teletransmission of the angular position, which is usually an apparatus composed of two synchros or selsyns, namely a first synchro whose rotor is fast with the axis of the antenna and a second telereceiver synchro coupled to the preceding one. Each synchro comprises a three-phase stator and a single-phase rotor. The telereception synchro has five terminals, three of which correspond to the three-phase stator and two to the rotor, and the composition of the three-phase voltages supplied by the three terminals of the stator permits of defining a revolving field whose angular position is the image of the angular position of the antenna. These voltages are called the synchro or selsyn voltages. In some cases, the antenna may remain fixed.

The radar station 1 periodically transmits into space electromagnetic pulses called radar pulses and it picks up any echoes from these pulses. It supplies a signal of variable intensity which indicates the power of any echo present, and this signal is called the video signal.

The duration of the pulses of conventional radar stations varies between a few tenths of a $\mu s$ and a few microseconds, which makes it compatible with the pass band of the magnetoscopes employed in television, which is of the order of 5 MHz.

The repetition period of the radar pulses varies from a few hundredths of a $\mu s$ to a few milliseconds and each pulse corresponds to a radial and coincides with the commencement of the scanning of this radial.

The radar station 1 supplies at the beginning of each radial a synchronising signal which is generally advanced by one or more microseconds in relation to the zero instant which corresponds to the emission of the electromagnetic pulse into space, which marks the beginning of the radial. These synchronising signals are known as radar synchro signals.

The circuits 2 for the utilisation of the radar signals usually comprise:

a panoramic screen call a PPI scope, which is a circular oscilloscope screen on which there appear the images of the targets detected by the radar. Each pulse of the radar is translated on the screen by a radial extending from the centre of the screen;

a visual display unit called an A scope which is an oscilloscope screen having rectangular coordinates. On this screen there are displayed the images of the video signals corresponding to the successive pulses of the radar station. For each pulse, the image appearing on the screen indicates along the abscissa the time elapsed since the emission of a pulse and along the ordinate the intensity of the video signal. This display supplies information regarding the presence and amplitude of an echo and regarding its distance from the radar station, but it gives no information regarding the bearing of the target.

The utilisation circuits 2 may also comprise particular circuits, for example an extractor. This effects an integration of a number of successive echoes from a common target and processes these echoes in accordance with a programme to decide automatically whether they are useful echoes. In this case it calculates the azimuth $\theta$, the distance $\rho$ and in some cases the speed of travel of the target.

The circuits 2 may also comprise circuits for the particular processing of the video signals, for example anti-sea clutter circuits, etc.

When the radar station 1, is used with visual display circuits 2, such as the PPI scope or the A scope, the radar synchro pulses are used to control the beginning of the scanning of each radial on the PPI scope or the horizontal scanning on the A scope. In addition, the PPI scope utilises the revolving field which is supplied by the tele-reception synchro to control the rotation of the radials in synchronism with the rotation of the antenna.

In some radar stations, notably those employed in association with a computer, the terminals of the synchro-receiver are connected to an analog/digital convertor which supplies a digital measure of the angle $\theta$ and which is called the antenna encoder or synchro-digital convertor.

It is proposed to retain in store, in a commercially obtainable television magnetoscope 4 (sometimes called a video tape recorder), without having substantially to modify the latter, all the items of information supplied by the radar station 1 and subsequently to reproduce these items of information at the utilisation circuits 2, so that the latter can operate in delayed time.

In order to achieve this, matching devices 5, are provided which comprise on the one hand circuits 5a by which all the items of information leaving the radar station 1 can be transformed in order to be brought into a form such that they can be recorded on the commercially obtainable television magnetoscope 4. These circuits 5a are called recording or multiplexing circuits, because they permit of mixing a number of items of information.

The device 5 comprises on the other hand circuits 5b, called reading or demultiplexing or retrieval or reproduction circuits, by means of which it is possible to convert the items of information recorded on the tape of the magnetoscope 4 before they are directed to the circuits 2, in order to reproduce them in a form identical with the initial form of the signals when they leave the radar station 1.

A television magnetoscope usually comprises two reels 4e, 4f and a magnetic tape 4c which forms a loop around a drum 4d bearing the magnetic recording and video reading head, which rotates at high speed in order to obtain the necessary pass band which is, for example, 5 MHz.

Television signals comprise a video signal, frame synchronising signals corresponding to the beginning of the scanning of each half-image, of which the period is 16 or 20 ms, and line synchronising signals, for example at a rate of 625 per image. In the following description, the line and frame synchronising signals will be briefly referred to as line synchro and frame synchro.

In the recording of a television transmission on a magnetoscope, the signal which enters the magnetoscope and that which leaves it are multiplexed signals comprising both the video signal and the frame and line synchros in the form of inverted square waves.

Figure 2:
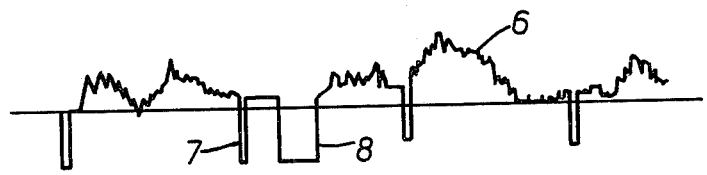
FIG. 2 is a partial representation of a television signal.

FIG. 2 illustrates an example of this signal comprising the video signal 6, line synchros 7 and a frame synchro 8.

The magnetoscope comprises filters for demultiplexing the signal and separating the video signal and the line and frame synchros.

Figure 3:
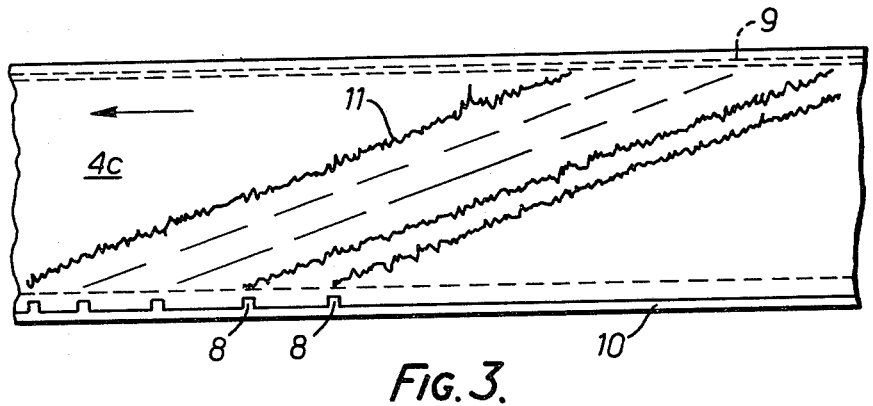
FIG. 3 is a representation of a section of a magnetoscope tape.

FIG. 3 illustrates the arrangement of the recordings on a tape section 4c of the magnetoscope. The tape 4c bears on its upper part one or two longitudinal tracks 9 which are the tracks for the recording of the sound or audio signal. For example, one of the tracks 9 has a pass band between 75 Hz and 10 KHz and the second a pass band between 250 Hz and 7.5 KHz.

The tape 4c bears on its lower part longitudinal track 10 on which there are recorded only the frame synchros 8, the said track being called the control track. Finally, the tape 4c bears a central recording zone on which the video recording head simultaneously inscribes in the form of oblique segments 11 the video signals and the line and frame signals. During the recording of the television images the speed of rotation of the recording head is very high, of the order of 3000 r.p.m., or one revolution every 20 ms. This rotation is slaved to the frame synchronising signals 8 which are present in the multiplexed signal, so that each oblique segment 11 corresponds to a half-image and is comprised between two successive frame synchros. At the same time, the frame pulses 8 are recorded on the track 10. Of course, the drawing of FIG. 3 is a diagrammatic representation and neither the scale of the signals nor the inclination of the oblique tracks corresponds to reality.

In the reading of the recording, the speed of rotation of the reading head and the speed of travel of the tape 4c are both controlled by the signals 8 inscribed in the recording on the control track 10, and owing to this control absolute speed and phase synchronism is established between the rotation of the head and the speed of the tape, so that the reading head falls exactly on each oblique segment 11. The recording of the frame synchros 8 is therefore essential. Now, in the radar signals, there are no frame synchros. It is therefore necessary to recreate them artificially for the purposes of the reading, even if they are unnecessary for the use of the radar signals in delayed time.

In television the line and frame synchros have a standardised duration, which is generally 6 $\mu$s for the line signals and 120 $\mu$s for the frame synchros.

There will hereinafter be described a category of matching devices 5 operating by pulse coding.

The matching circuits 5 comprise on the one hand circuits for recording and reading the video and synchro signals of the radar and on the other hand for recording and reading the signals of the angular position of the antenna of the radar.

The following figures relate to circuits for recording and reproducing the radar signals by this process wherein, at recording, the radar synchronising pulses and the signals which measure the antenna rotation are encoded in the form of a predetermined number of pulses supplied by a high-frequency oscillator and, at reading, these signals are decoded and separated by measurement of the number of pulses.

The circuits employed in this method have the advantage that they render possible, in the reading, a more precise differentiation of the pulses which must be separated from one another without any necessity for amplitude threshold adjustments, which are always delicate operations. The demultiplexing obtained by a pulse coding method is more reliable because the dangers of false synchronising pulses due to interference are very reduced.

Figure 4:
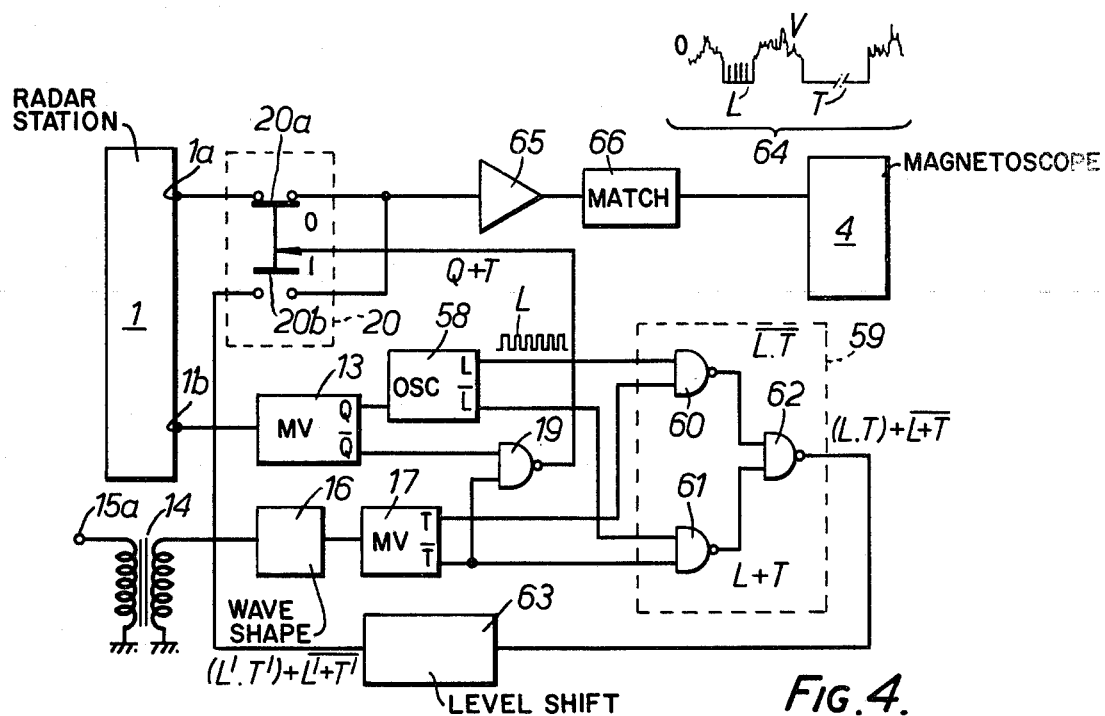
FIGS. 4 to 14 concern recording and reading matching circuits according to a pulse coding method.

FIG. 4 is the synoptic diagram of the circuits for the recording of the video signals, the radar synchro signals and the pulses T by pulse coding.

Figure 5:
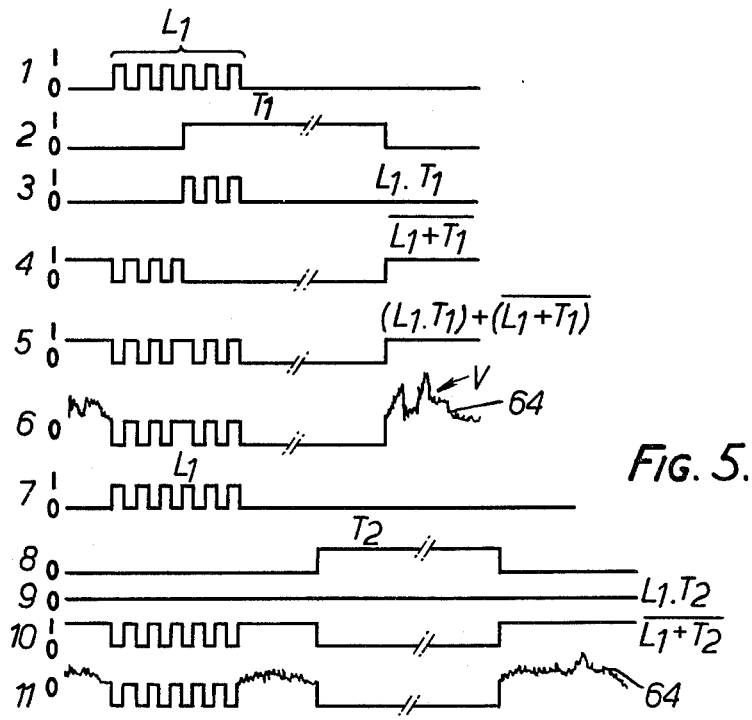

FIG. 5 is a curve diagram illustrating the pulses as a function of time.

Figure 6:
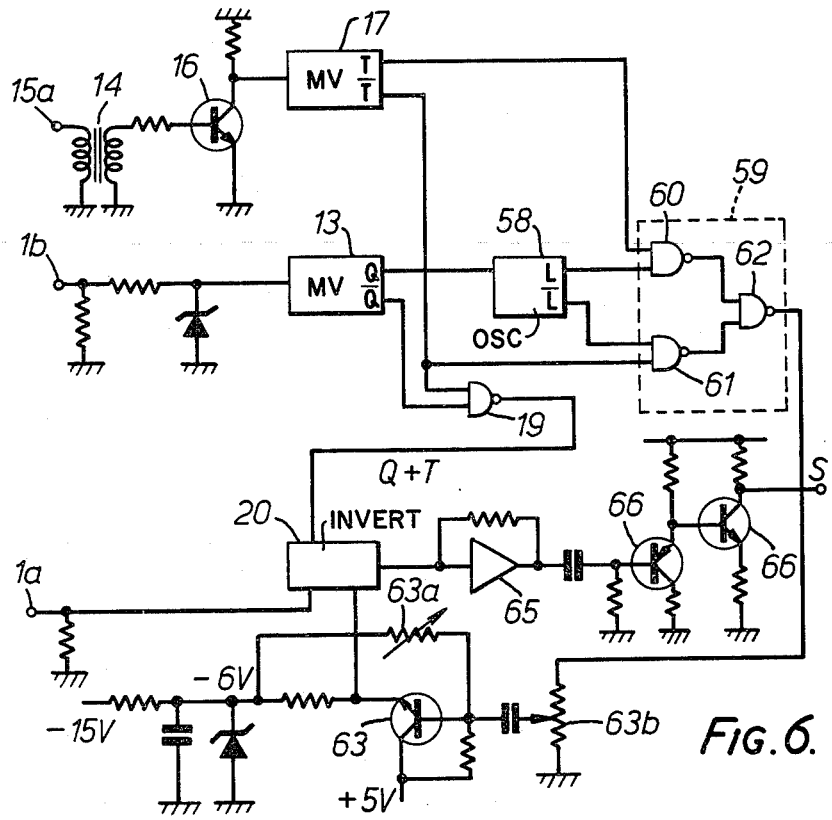

FIG. 6 is the developed diagram of an example of the construction of a circuit according to FIG. 4.

The reference 1 denotes the radar station, the reference 1a an output terminal for the radar video signal V and the reference 1b an output terminal for the advanced synchro of the radar. The reference 14 denotes a transformer for coupling to a 50 Hz or 60 Hz alternating-current source 15a. The reference 16 denotes shaping circuits and the reference 17 a monostable multivibrator having a duration of 120 μs which supplies film pulses T and $\overline{T}$ having a duration of 120 μs and a frequency of 50 or 60 Hz.

Likewise, the reference 13 denotes a monostable multivibrator which is connected to the output 1b and which supplies pulses Q and $\overline{Q}$ having a duration of 6 μs which are synchronous with the advanced synchro pulses of the radar station 1.

The circuit of FIG. 4 comprises a NAND gate 19 which is connected to the outputs $\overline{Q}$ and $\overline{T}$ of the monostable multivibrators 13 and 17 and which supplies a logic signal corresponding to $\overline{Q \cdot T} = Q + T$.

The circuit of FIG. 4 comprises in addition a double analog inverter 20 which has two contacts 20a and 20b and which is controlled by the output of the gate 19. When this output is at zero level, i.e. when there is neither Q nor T, the contact 20a is closed and the video signal V is transmitted to the output of the change-over switch 20, is amplified by an amplifier 65 and is sent to the video recording head of the magnetoscope 4 through matching circuits 66.

When there is at least one of the signals Q and T, the output of the gate 19 is at the high level, the contact 20a is open and the video signal V is no longer transmitted. On the other hand, the contact 20b is then closed and we shall now explain what information it transmits.

The output Q of the monostable trigger circuit 13 is connected to an oscillator 58 having a constant frequency of 1 MHz which is started each time Q is positive and which emits while Q is positive a train L of six successive pulses, each of which has a duration of 0.5 μs and which are separated from one another by a duration of 0.5 μs. There are employed two outputs of opposite polarities of the oscillator, one of which supplies pulse trains L and the other the inverse trains $\overline{L}$. Each train L of six successive pulses therefore represents in coded form a radar synchro.

FIG. 4 shows in chain lines an integrated circuit 59 which performs on the signals L, T and their inverses the logic function $\overline{L \cdot T}(L+T) = \overline{L \cdot T} + \overline{(L+T)}$.

This circuit is illustrated in the form of three NAND gates 60, 61 and 62.

The two inputs of the gate 60 are connected to the outputs L and T of the circuits 17 and 58 and this gate therefore supplies a logic signal $\overline{L \cdot T}$. The two inputs of the gate 61 are connected to the outputs $\overline{L}$ and $\overline{T}$ of the circuits 17 and 58 and the output of the gate 61 therefore supplies the logic signal $\overline{\overline{L} \cdot \overline{T}} = L + T$. The gate 61 could be replaced by an OR gate, of which the two inputs would be connected to the outputs L and T. The two inputs of the gate 62 are connected to the outputs of the two gates 60 and 61 and the gate 62 therefore supplies the logic signal $\overline{L \cdot T} \cdot (L+T)$ which is equal to $(L \cdot T) + \overline{(L+T)}$.

The output of the logic circuit 59 is connected to a circuit 63 for shifting the mean value, which has the function of effecting a downward translation of the level of the signal, which becomes $[L \cdot T + \overline{(L+T)}] = L'T' + \overline{L'+T'}$.

This translation has the effect that, while remaining in positive logic, the signals are constantly negative, that is to say, the high level equal to 1 is the zero level or a slightly negative level and the low level equal to zero is an even more negative level.

The output of the circuit 63 is connected to the contact 20b of the change-over switch 20.

The switch 20 therefore supplies a multiplexed signal 64 which is the video signal V when neither Q nor T exists.

When at least either Q or T exists, it supplies a signal which is equal to $(L' \cdot T') + \overline{(L'+T')}$.

The output of the circuit 20 may be symbolised by the formula V $\cdot \overline{(Q+T)} + (Q+T)[(L' \cdot T') + \overline{(L'+T')}]$.

There is shown in FIG. 4 the form of the multiplexed signal 64, which comprises a video signal V in positive, the continuous signals T' having a duration of 120 μs in negative, and trains L' of six successive pulses in negative. It happens that pulses L' and T' are simultaneous. The curve diagram drawn as a function of time in FIG. 5 makes it possible to illustrate the result obtained in this case. In this diagram, the pulses T1, T2, which have a duration of 120 μs, are not drawn to scale.

The line 1 of the diagram represents a train L1 of six pulses which partially coincides with T1 shown in line 2.

Line 3 indicates the function L1·T1. It will be seen from this line that during the coincidence between the two signals, the function L1·T1 reproduces the pulses of the train L1. The fourth line represents the function $\overline{(L1+T1)}$. While L1 alone exists, there is obtained a pulse train $\overline{L1}$ inverted in relation to L1. While T1 exists, there is constantly obtained a low-level signal. The fifth line shows the addition of the lines 3 and 4, that is to say, the signal $(L \cdot T) + \overline{L+T}$ where at least L or T exists. The sixth line shows the composed multiplexed signal $V \cdot \overline{(Q+T)} + (Q+T)[L' \cdot T') + \overline{(L'+T')}]$, that is to say, the addition on the one hand of the line 5, offset below the zero level, and on the other hand of the video signal situated above the zero level when neither Q nor T exists. It will clearly be seen from this graph that the encoded pulses of the radar synchros which fall in a pulse T are not suppressed. The pulse T is slightly shortened, but this shortening, which represents at most about 5% of the duration of the pulse T, does not interfere with the good operation of the control of the magnetoscope.

The lines 7 and 8 of the diagram of FIG. 5 represent the case when the synchros L1 and T2 do not overlap.

Line 9 represents the function L1·T2 which is always equal to zero in this case.

The line 10 represents the function $\overline{L1+T2}$ which is equal to $\overline{L1}+\overline{T2}$ by reason of the fact that L1 and T2 are never simultaneous, and the line 11 represents the multiplexed signal which is equal either to V outside of L1 and T2, i.e. to L'1 or T'2.

There has been described by way of example an embodiment in which the frequency of the oscillator 58 is 1 MHz and in which the line synchro pulses which last 6 μs are encoded in the form of a train of six pulses. It is obvious that the frequency of the oscillator and consequently the number m of pulses could be different. It is useful to encode the line synchros in the form of a high number of pulses in order to minimise the probability of error due to parasitic pulses in the decoding. However, the frequency of the oscillator cannot be increased too much owing to the fact that the pass band of the magnetoscope is limited to 5 MHz. A 1 MHz oscillator and trains of six pulses represent a practical compromise which is fully satisfactory.

The pulses T cannot be encoded because they are used for the synchronisation of the speed of rotation of the reading head of the magnetoscope and they must therefore be recorded in a form identical to that of the television frame pulses.

There will be seen in FIG. 6 a form of construction of the signal level shifting circuit 63. This circuit is composed of an NPN transistor 63 and of a potentiometer 63a by means of which it is possible to adjust the potential of the emitter of the transistor to a negative value which defines the downward shift of the signals. The amplitude of the signals is adjusted by means of a potentiometer 63b.

Figure 7:
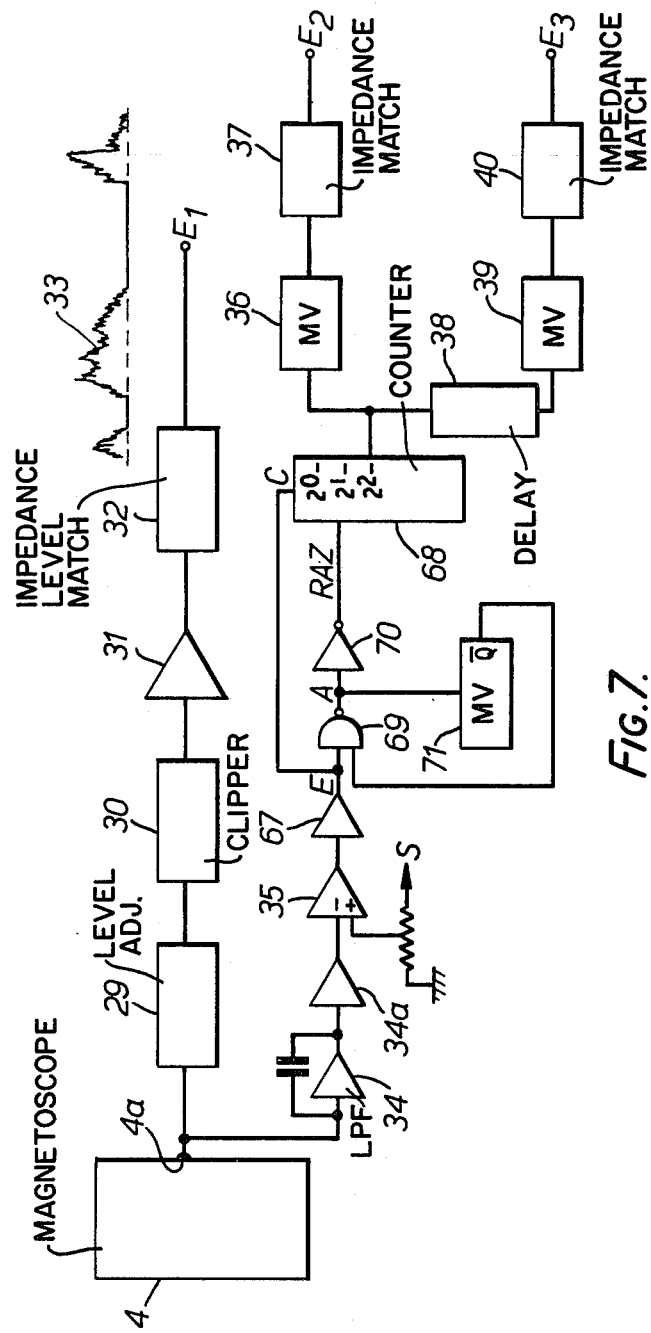

FIG. 7 is the synoptic diagram of the circuits for the reproduction, decoding and demultiplexing of the video and synchro signals, which have been recorded on the central track of the tape of the magnetoscope by way of the matching circuits according to FIGS. 4 and 6.

Figure 8:
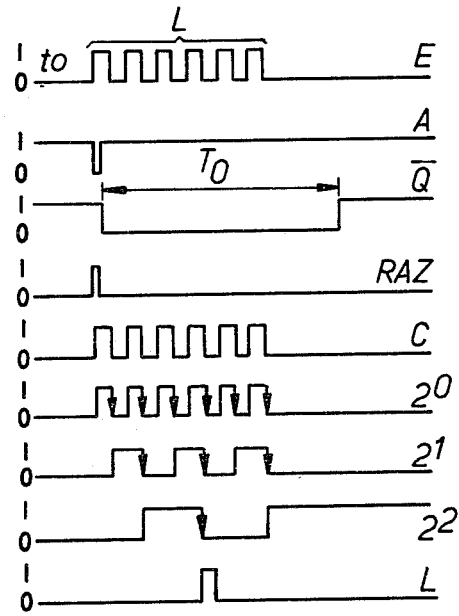

FIG. 8 is a diagram of the signals as a function of time at different points and at different circuits.

Figure 9:
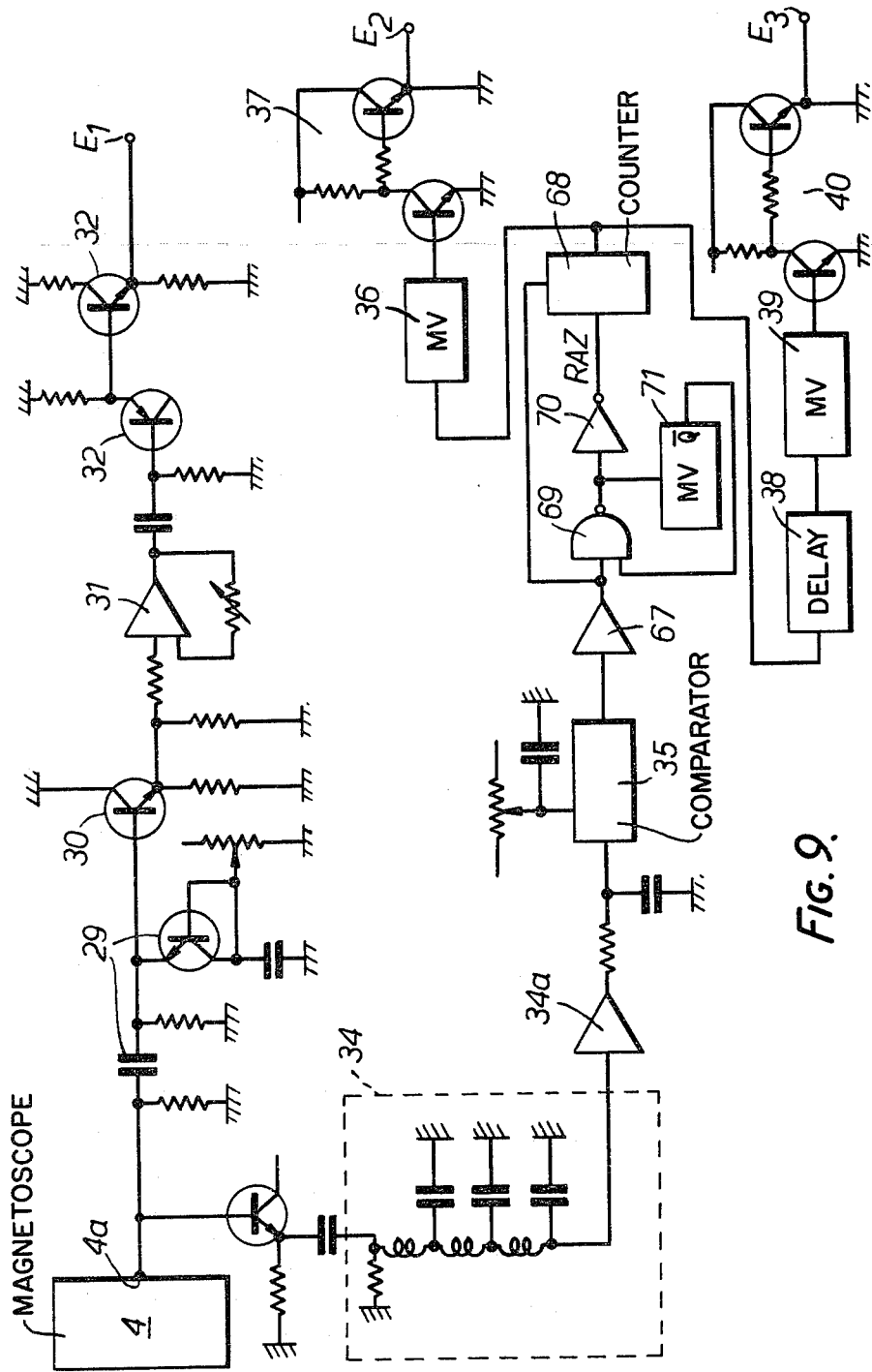

FIG. 9 is a developed diagram of an example of the construction of a circuit according to FIG. 7. The upper line of FIG. 7 represents the circuits for the reproduction of the radar video. The output 4a is connected to circuits 29 for fixing the continuous level of the signal.

The output of the circuit 29 is connected to a circuit 30 for clipping the bottom of the signal, which is intended to suppress the line and frame synchronising signals and to retain only the video signals.

The circuit 30 may be composed of an NPN transistor which receives the multiplexed signal at its base and which is positively biased, so that it stops all the signals whose level is negative.

The output of the circuit 30 is connected to an amplifier 31, the output of which is connected to impedance and level matching circuits 32. The output E1 of the circuit 32 supplies a radar video signal 33 freed from the line and frame synchro signals.

The lower line of FIG. 7 comprises a low-pass filter 34 succeeded by an amplifier 34a and a logic comparator 35 which compares the signal with a slightly negative threshold S and which allows to pass only the negative signals whose absolute value is above the absolute value of the threshold S, that is to say, only the pulse trains L' and the signals T'.

The output of the threshold detector 35 is connected to a level and impedance matching amplifier 67.

The output of the amplifier 67 is connected in common to the input of a binary pulse counter 68 and to an input of a NAND gate 69. The output of the NAND gate 69 is connected by way of an inverter 70 to the resetting line RAZ of the counter 68, which is reset when the output of the inverter 70 is positive. In addition, the output of the NAND gate 69 is connected to a monostable multivibrator 71, of which the output Q is looped to the second input of the gate 69. The change-over time of the monostable multivibrator 71 is slightly greater than the duration of the pulse trains L'. For example, it is of the order of 8 μs.

The circuits 68 to 71 have the function of detecting, in the signal leaving the threshold detector 35, the presence of trains comprising a number of successive pulses, for example four pulses, succeeding one another in a time limit which is the duration To (not to be confused with the frame— see also FIG. 8) of the change-over of the monostable multivibrator 71. Each time such a train is detected the output of order $2^2$ of the counter 68 changes state and this change of state is converted into a presynchronising pulse by a monostable multivibrator 36 and matching circuits 37, and into a synchronising pulse by a delay circuit 38, a monostable multivibrator 39 and matching circuits 40.

The output E2 supplies the presynchronising pulses and the output E3 the radar synchronising pulses.

The curve diagram of FIG. 8 shows along the abscissa the time and along the ordinates, on the successive lines, the signals appearing at different points E, A, $\overline{Q}$, RAZ, C and at the outputs $2^0$, $2^1$ and $2^2$ of the counter 68.

The initial state to precedes the arrival of a pulse at the output E of the inverter. At this instant, E is at the level 0 and therefore A is at the level 1 and RAZ is at the zero level.

The monostable multivibrator 71 is in the state of rest and therefore $\overline{Q}$ is at the level 1.

When the positive-going edge of a first pulse appears, E passes to the level 1 and since $\overline{Q}$ is also at the level 1, A passes to the level zero and RAZ passes to the level 1, whereby the counter is reset. In changing to the level 1, A triggers the monostable multivibrator 71, the output $\overline{Q}$ of which passes to the level zero and remains there throughout the time T for the setting of the monostable multivibrator.

The passage of $\overline{Q}$ to zero closes the gate 69 and A returns immediately to the level 1, and therefore RAZ returns to the level zero. The counter is ready to record the pulses.

As long as the monostable multivibrator 71 remains set, neither A nor Q nor RAZ changes state and the counter 68 registers the successive pulses. When the number of pulses corresponding to the chosen output, for example $2^2=4$ in the described example, has been counted, the output $2^2$ of the counter changes sign and the negative-going edge of this sign change indicates the presence of a train of four pulses which are succeeded in a time of less than $T_o$ and signifies the presence of an encoded synchronising pulse and gives rise to such a pulse L. It will be seen that the monostable multivibrator 71 returns the counter to zero immediately a first pulse appears. It therefore avoids accummulating any parasitic pulses produced outside the setting period of the monostable multivibrator, because the counter is returned to zero at each isolated pulse. It makes it possible to take into account the pulse trains only in the case where a train of at least four pulses very rapidly succeed one another, which is a very reliable method of decoding the synchronising pulses and differentiating them from the pulses T which are thus suppressed.

For the sake of reliability of detection, it would be useful to increase the number of pulses contained in each train, but it has previously been seen that it is scarcely possible to increase the latter because of the pass band of the magnetoscope, which is limited to 5 MHz.

Figure 10:
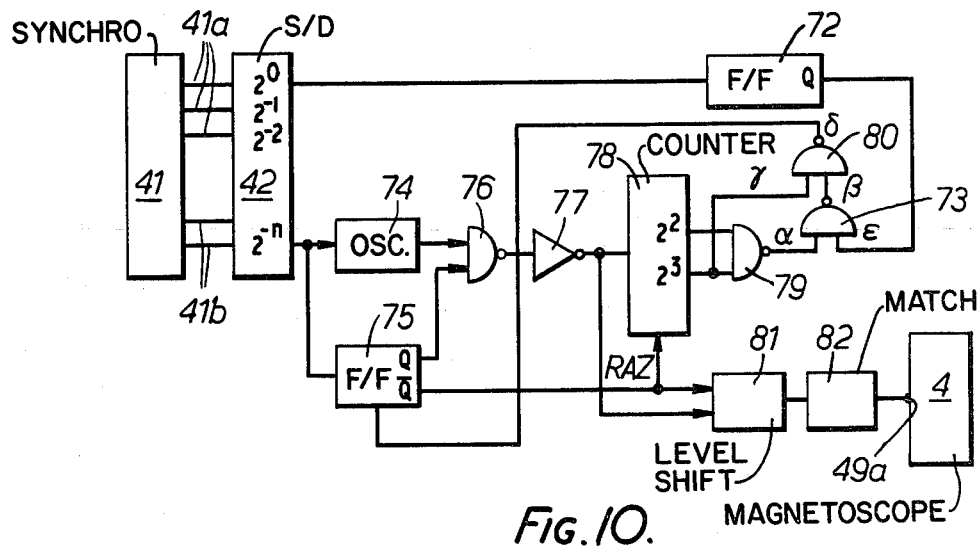

FIG. 10 is a synoptic diagram of the recording circuits employing the method comprising encoding of pulses of the angular position $\theta$ of the antenna of the radar station 1.

Figure 11:
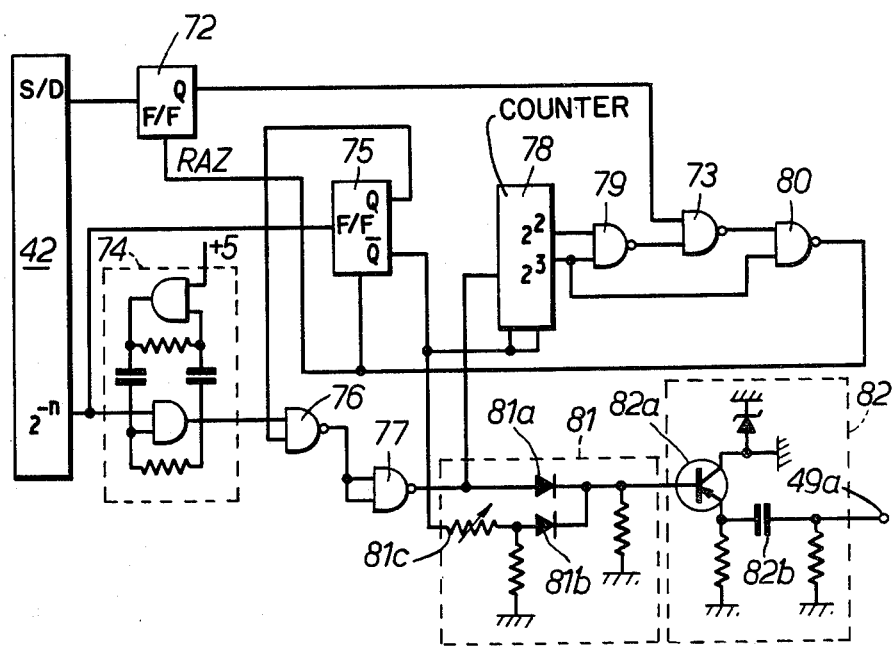

FIG. 11 is a developed diagram of an example of the construction of a circuit according to the synoptic diagram of FIG. 10.

Figure 12:
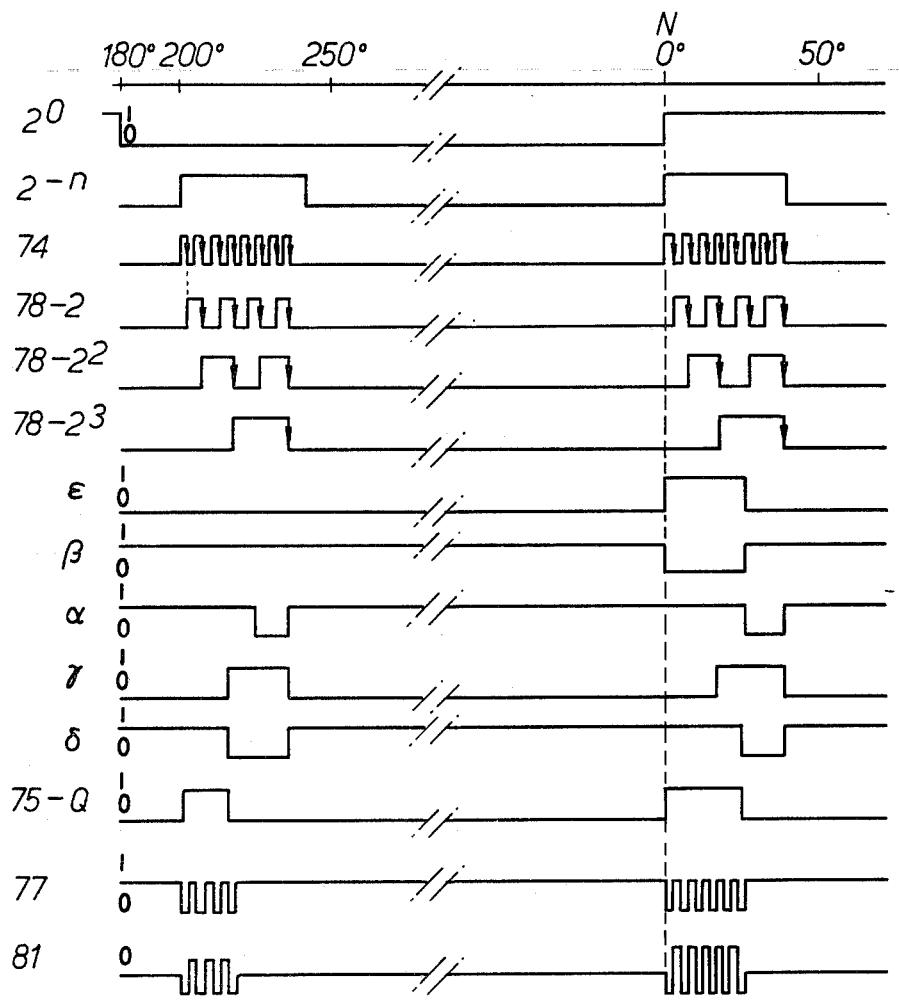

FIG. 12 is a curve diagram illustrating the signals at various points referenced on FIG. 10.

There will be seen in FIGS. 10 and 11 a receiver synchro 41 having three conductors 41a which are connected to the three three-phase windings of the stator. Two conductors 41b correspond to the single-phase winding of the rotor. A synchro-digital convertor 42 is associated with the synchro 41 and comprises $n+1$ digital outputs numbered from $2^o$ to $2^{-n}$ in the order of increasing rank.

The terminal $2^o$, which triggers only once in each direction during complete revolution of the antenna, is connected to a flip-flop 72, of which the output Q is connected to an input $\epsilon$ of a NAND gate 73, the function of which will hereinafter be explained.

The terminal $2^{-n}$ of the convertor 42 is connected to an oscillator 74 which has a period of 300 $\mu$s (frequency 3.3 KHz) and which is started whenever it receives a positive pulse emitted by the output $2^{-n}$. The frequency of this oscillator must be compatible with the pass band of the audio tracks, which is 10 KHz. On the other hand, the duration of the pulses emitted by the output $2^{-n}$ must be greater than the period of the oscillator.

If the converter 42 has ten outputs numbered from $2^o$ to $2^{-9}$ and if the period of rotation of the antenna is of the order of two seconds, the period of the changes of state of the gate $2^{-9}$ is of the order of 4 ms and the duration of each positive pulse emitted by the gate $2^{-9}$ is of the order 2 ms and each positive pulse therefore triggers the emission of trains of at least six successive pulses from the oscillator 74.

The gate $2^{-n}$ is also connected to a flip-flop 75.

The output of the oscillator 74 and the output Q of the flip-flop 75 are connected to the two inputs of a NAND gate 76 whose output is connected to an inverter 77. The NAND gate 76 and the inverter 77 are equivalent to an AND gate. The output of the inverter 77 is connected to the input of a binary pulse counter 78 having outputs of increasing weight $2^o$, $2^1$, $2^2$, $2^3$, etc.

The output $\overline{Q}$ of the flip-flop 75 is connected to the resetting terminal RAZ of the counter 78. The said counter is returned to zero when the terminal RAZ is at the level 1 and it counts when RAZ is at the level zero.

The outputs $2^2$ and $2^3$ of the counter 78 are connected to the two inputs of a NAND gate 79, the output of which is connected to the second input $\alpha$ of the gate 73.

The output of the gate 73 is connected to an input $\beta$ of a NAND gate 80. The second input $\gamma$ of the gate 80 is directly connected to the output line $2^3$ of the counter 78. The output $\delta$ of the gate 80 is connected to the resetting terminals of the flip-flops 72 and 75, which are reset when the output $\delta$ is at the level zero.

The output of the inverter 77 and the output $\overline{Q}$ of the flip-flop 75 are connected to a level shifting circuit 81 which has the effect of shifting the pulses so that the mean value of the signals is always the same whether or not there is a signal at the output $2^{-n}$. FIG. 11 illustrates a mode of construction of the circuit 81 and of the circuit 82, which is at the same time a level and impedance matching circuit whose output is connected to the terminal 49a of the magnetoscope 4, which is the sound input terminal.

The circuit 81 is composed of two diodes 81a and 81b which performan OR function.

When there is no signal at the output $2^{-n}$, the output Q of the flip-flop 75 is at the level 1. A potentiometer 81c is provided to adjust the level of the positive signal so that it is equal to the mean level of the signals emitted by the inverter 77. When there is a signal at the output $2^{-n}$, the pulses emitted by the inverter 77 pass through the diode 81a. The mean value of the signals is returned to zero by the circuit 82, which performs a level shift and a suppression of the continuous component by way of the negative bias of the transistor 82a and of the capacitance 82b.

The operation of the circuit for recording the angular position $\theta$ in accordance with FIGS. 10 and 11 can be explained by means of the curve diagram of FIG. 12. The object aimed at is to encode differently, on the one hand, the pulses $\theta$ which measure the angle and are supplied by the terminal $2^{-n}$ of the convertor, and on the other hand the pulse N resulting from the movement of the antenna to the North, which is supplied by the output $2^o$ of the convertor.

The encoding method adopted is a train of pulses supplied by the started oscillator 74. By way of preferred example, there are adopted as the code trains of four successive pulses for the pulses of angular position $\theta$ and trains of six successive pulses for the pulses N resulting from the movement of the antenna to the North.

The line 1 of FIG. 12 represents the angular position of the antenna plotted in relation to the North N. The movement to the North is placed at the middle of the line and the commencement of the line corresponds to the movement to 180°. The lines 2 and 3 of the diagram indicate the changes of state of the outputs $2^o$ and $2^{-n}$ of the convertor 42.

For the sake of clarity of the drawing, there are shown only two pulses of the output $2^{-n}$, a first pulse which does not coincide with the movement of the antenna to the North and a second pulse which coincides with this movement. The fourth line marked 74 indicates the trains of eight successive pulses emitted by the oscillator 74 during each pulse of the preceding line.

The lines 5, 6 and 7 of the diagram, referenced 78-2, 78-2$^2$ and 78-2$^3$, indicate respectively the changes of state of the binary outputs of order 2, $2^2$ and $2^3$ of the counter 78.

The negative-going edges of the pulses are marked by an arrow to indicate that it is these negative-going edges of a flip-flop which cause the succeeding flip-flop to change state. The three lines show that the output $2^3$ remains at the level zero until the negative-going edge of the fourth pulse and that, after negative-going edge of the sixth pulse the outputs $2^2$ and $2^3$ of the counter are both simultaneously at the upper level for the first time since the commencement of a count. This property is utilised.

The eighth line, referenced ε, indicates the changes of state of the input ε of the gate 73 which corresponds to the output Q of the flip-flop 72. When the position of the antenna is between 180° and 360°, the output $2^o$ is at the level zero, and the output Q of the flip-flop 72 is also at zero. At the movement of the antenna through the North, Q and ε become equal to 1 and remain so until the resetting of the flip-flop 72 when the output δ of the gate 80 changes to the zero level.

The succeeding line, marked β, indicates the changes of state of the output of the NAND gate 73. As long as ε is at zero level, β is positive regardless of the condition of α. On the other hand, after the change of the antenna to the North, ε having become positive, the change of state of α will bring about the change of state of β.

The line γ corresponds to the pulses arriving at the second input of the gate 80, which are identical to those which are emitted by the output $2^3$ of the counter 78.

The line δ indicates the changes of state of the output of the gate 80, which controls the resetting of the flip-flops 72 and 75 when this output is at the level zero.

Before the change-over of the antenna to the North, β being constantly positive, δ is equal to γ. In this case, when a pulse appears at the output $2^{-n}$, the flip-flop 75 triggers.

The output Q of this flip-flop becomes positive. The gate 76 is opened and the pulse train emitted by the oscillator passes to the recording unit until the instant when a positive pulse appears at γ at the output $2^3$ of the counter, that is to say, after the negative-going edge of the fourth pulse.

At this instant, γ becomes positive, δ passes to zero, the flip-flop 75 is reset, and the gate 76 closes and interrupts the passage of the pulses until a new positive pulse is emitted by the output $2^{-n}$ of the convertor 42. At the same time, the counter 78 is reset owing to the change of state of the output Q of the flip-flop 75, which becomes positive.

The succeeding line of the diagram, marked 75-Q, indicates the duration of the positive square waves of the output Q of the output Q of the flip-flop 75.

The line 77 shows the train of inverted pulses which leave the invertor 77 during the positive square wave of the output Q of the flip-flop 75.

The last line of the diagram, marked 81, shows the raising of the mean level of the pulses due to the circuit 81, so that the mean level is in the neighbourhood of zero. This raising takes place only during the emission of the pulses, because the circuit 81 is connected to the output Q of the flip-flop 75 and when the latter changes to zero, the raising ceases.

At the change of the antenna to the North, there is obtained at the output $2^{-n}$ a positive pulse identical to the others. The device makes it possible to differentiate and encode it in the form of a train of six pulses. For this purpose, the device utilises the difference due to the change of state of the line $2^o$ which occurs when the antenna changes to the North.

The flip-flop 72 then changes over and the output Q of this flip-flop, denoted by ε, becomes equal to 1. The level of β is then conditioned by that of α and is equal to $\bar{\alpha}$.

The outputs $2^2$ and $2^3$ of the counter 78, which are connected to the two inputs of the NAND gate 79, simultaneously become positive after the negative-going edge of the sixth pulse entering the counter after the latter has been reset. Previously, at least one of the two outputs was at zero level and α was positive. α changes to zero after the sixth pulse and until the end of the eighth, and β is therefore negative from the first pulse to the sixth and becomes positive after the sixth. α, which is equal to the output $2^3$, is positive from the fourth pulse and therefore when β becomes positive, after the sixth pulse, γ then being positive, δ changes to zero, which has the effect of resetting the flip-flops 72 and 75.

The resetting of the flip-flop 75 results in closing of the gate 76, resetting of the counter and stopping of the passage of the pulses to the recording unit.

It will therefore be seen that the North pulse has been encoded in accordance with a train of six successive pulses instead of a train of four successive pulses for the pulses for the measurement of the angular position θ of the antenna.

Figure 13:
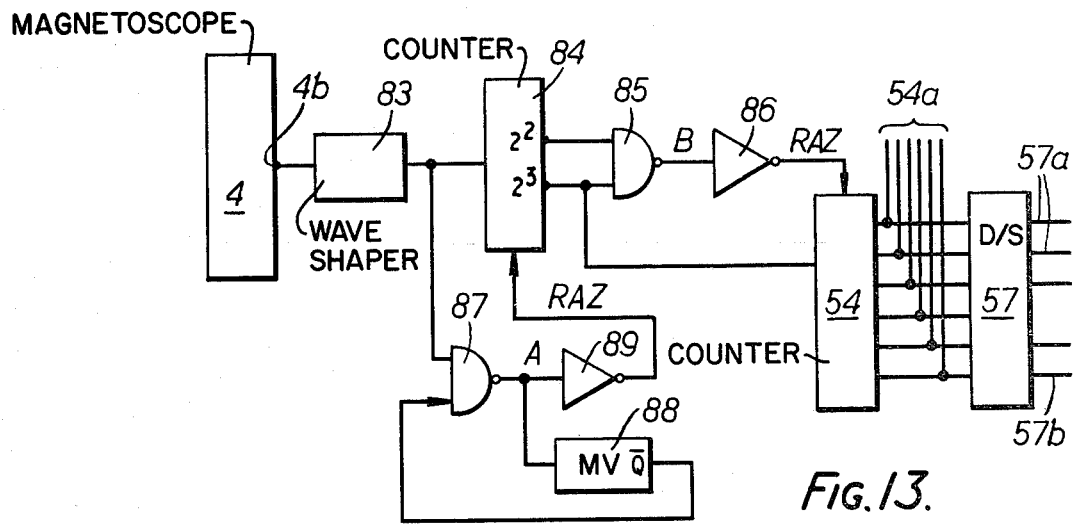

FIG. 13 is a synoptic diagram of the reading circuits employed in the method involving pulse coding of the information relating to the rotation of the antenna, which is recorded on the audio track of the magnetoscope by means of the circuits according to FIGS. 10 and 11.

The output 4b of the magnetoscope, which is the output connected to the reading head of the audio track 9, is connected to a circuit 83 for the shaping of the signals. The circuit 83 is connected to a binary pulse counter 84, the binary outputs of order $2^2$ and $2^3$ of which are connected to a NAND gate 85.

The output B of the gate 85 is connected to an inverter 86 which supplies positive pulses corresponding to the movement of the antenna to the North, which is used for resetting a binary counter 54. The NAND gate 85 and the inverter 86 are equivalent to an AND gate.

The output of the circuit 83 is connected to an input of a NAND gate 87, the output A of which is connected to the input of a monostable multivibrator 88.

The circuit $\bar{Q}$ of the monostable multivibrator is looped to the second input of the gate 87. The output of the gate 87 is also connected through an inverter 89 to the resetting terminal RAZ of the counter The assembly formed of the gate 87, the inverter 89 and the monostable multivibrator 88 performs the same function as the circuits 69, 70 and 71 of FIG. 7.

The first pulse of each pulse train triggers the monostable multivibrator 88 and the latter remains set for a limited period $T'_o$. At the same time, the first pulse of each pulse train produces the resetting of the counter 84, so that the latter recommences to count from zero at the beginning of each pulse train and the counting ceases after the period $T'_o$, which avoids inclusion of parasitic pulses in the counting.

The output $2^3$ of the counter 84 is connected to the input of the counter 54, which counts the successive pulses emitted by the output $2^3$, which emits a pulse whenever the counter 84 has received four successive pulses. On the other hand, the output of the gate 85 changes state when the counter 84 has received a train of six successive pulses, that is to say, only when the coded pulse is a North pulse. The counter 54 is connected to a digital-synchro converter 57.

The binary counter 54 is associated with the digital-synchro converter 57 which supplies at three output terminals 57a three three-phase voltages and which receives at two terminals 57b a reference voltage. In addition, the digital outputs 54a can be connected in parallel with the outputs of the binary counter 54 so as to supply a digital measure of the angular position in the case where it is desired to use an extractor or a computer for processing the items of information recorded on the magnetoscope.

Figure 14:
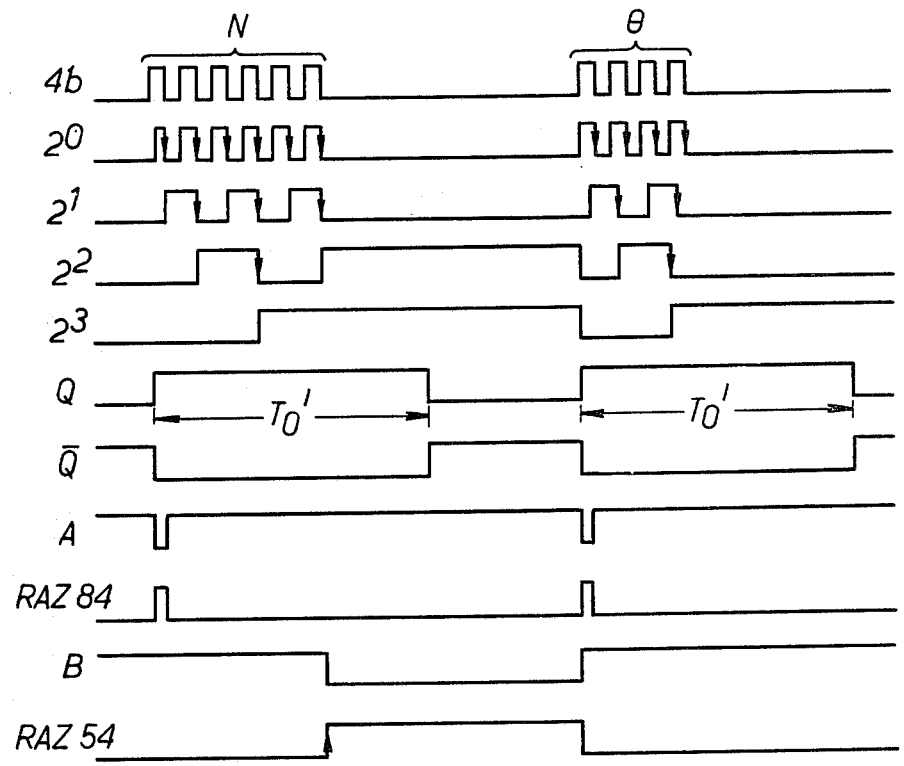

FIG. 14 is a curve diagram of the signals at various points of the circuit.

The first line represents a train of pulses occurring at the output 4b of the magnetoscope, which can be a six-pulse train N or a four-pulse train θ.

The second, third, fourth and fifth lines represent respectively the successive changes of state of the binary outputs of increasing weight $2^0$, $2^1$, $2^2$ and $2^3$ of the counter 84.

The sixth and seventh lines represent the square waves, of a duration of T, which appear at the outputs Q and $\overline{Q}$ of the monostable multivibrator 88 after the commencement of each pulse train. Before the beginning of a pulse train, Q=1 and therefore A=1. As soon as the first pulse arrives, A becomes equal to 0 and the monostable multivibrator 88 changes over and remains in the changed-over position for a time $T'_o$. A becomes positive immediately and the inverter 89 sends a positive resetting pulse RAZ 84 to the counter 84, which commences to count the successive pulses appearing during the time $T'_o$.

The negative-going edge of the fourth pulse produces the change of state of the binary output $2^3$ of the counter 84 and successive pulses emitted by the output $2^3$ are counted by the counter 54, the terminal RAZ of which is at zero potential. If the pulse leaving the magnetoscope is a North pulse coded in the form of a train of six successive pulses, the negative-going edge of the sixth pulse produces the change of level of the output B of the gate 85, as is apparent from the penultimate line of the graph. The last line of the graph represents the resetting pulse of the counter 54, which is supplied by the inverter 86 at the end of the sixth pulse. The resetting terminal RAZ of the counter 54 remains at the level 1 until the beginning of the next pulse train θ is reset to zero level when the counter 84 is reset.

Figure 15:
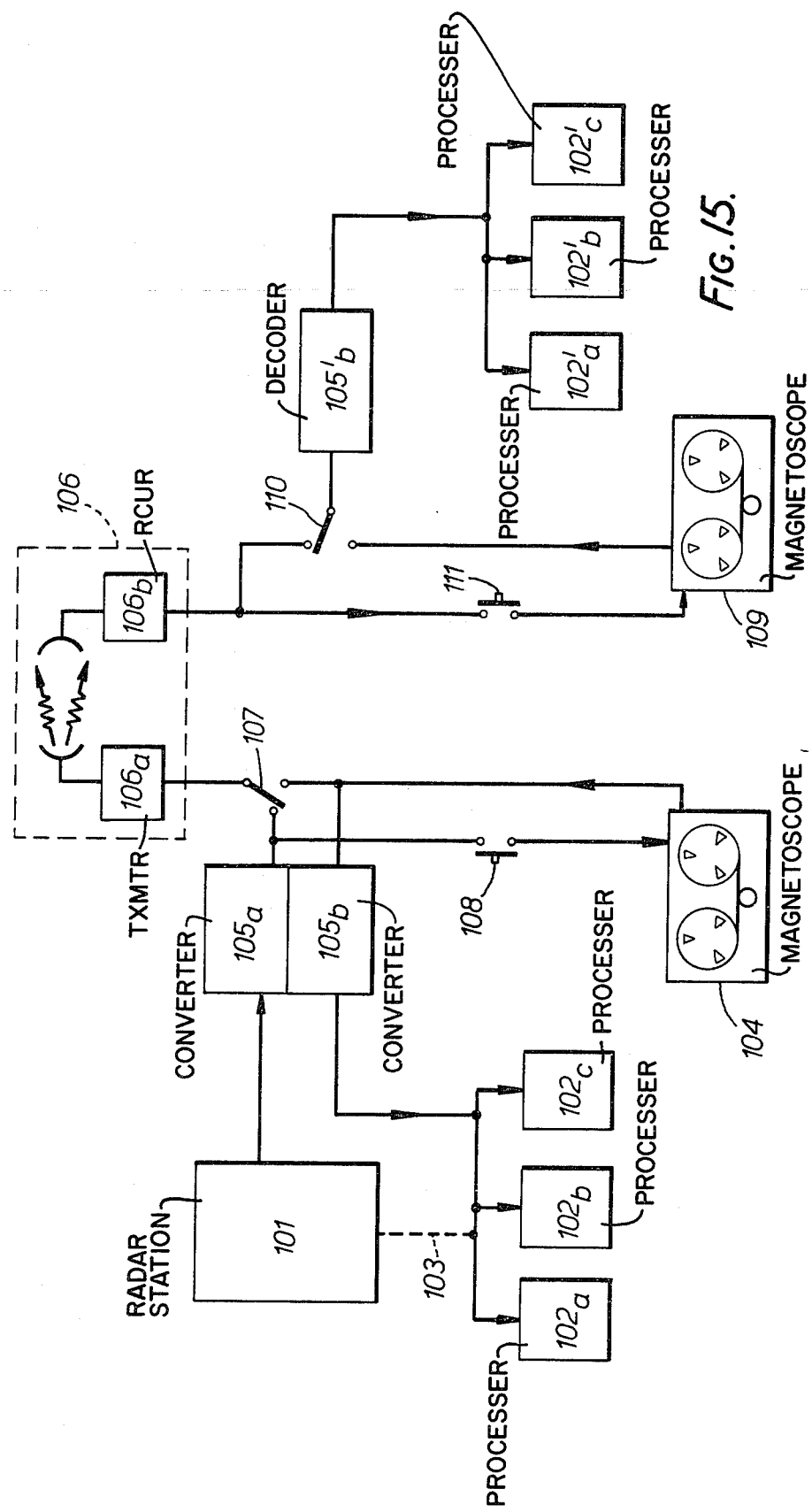
FIG. 15 is a general diagram of possible applications of a system according to FIG. 1.

FIG. 15 illustrates a radar station 101 of any known type and the usual equipment 102a, 102b, 102c for the local processing of the signals emitted by the radar. The chain line 103 represents the usual link between the radar and the local equipment 102 for the processing of the signals in real time. The local equipment comprises, for example, a circular panoramic screen 102a, called a PPI scope, a rectangular-coordinate oscillographic screen 102b, called an A scope, and various equipments 102c such as an extractor, anti-clutter circuits, various circuits for the processing of the video signals, etc.

There will be seen the same devices 102'a, 102'b, 102'c located at a distance from the radar, for example at the processing centre where the items of information coming from a number of radars are collected.

The reference 105a denotes a device which is intended to convert the signals emitted by the radar station 101 for coding them in a form such that they can be either recorded on a local commercially obtainable television magnetoscope 104, having only two input channels, or transmitted to a distance over a telecommunications network, for example over a television radio system 106 comprising a transmitter 106a and a receiver 106b. Of course, the items of information can be recorded on the magnetoscope 104 and simultaneously transmitted in real time over the network 106.

The inverter 107 also makes it possible to transmit in delayed time items of information previously recorded on the magnetoscope 104. The reference 108 represent a pushbutton for starting the recording on the magnetoscope 104.

The reference 105b represents that part of a device by means of which it is possible to decode the items of information stored in the local magnetoscope 104 in order that they may be processed in delayed time in the local apparatus 102a, 102b, 102c for the processing of the radar signals.

The reference 105'b denotes a device identical to the device 105b by means of which it is possible to decode the information transmitted to a distance for application to the processing apparatus 102'a, 102'b and 102'c.

Signals transmitted by the network 106 can also be recorded at a distance on a second television magnetoscope 109 having two inputs.

An inverter 110 makes it possible to process on the apparatus 102'a, 102'b, 102'c either the information emanating from the network 106 or the information stored on the magnetoscope 109. By combining the positions of the inverters 107 and 110, therefore, it is possible to process in the remote processing apparatus 102'a, 102'b and 102'c either in real time the signals emitted by the radar 101, or in delayed time the signals recorded on one of the magnetoscopes 104 and 109. The reference 111 denotes a pushbutton for starting the recording on the magnetoscope 109.

The extent of the possible applications of the devices which are interposed between the output of the radar station and the radar signal processing circuits, using in addition to the circuits 105a and 105b only commercially obtainable television magnetoscopes and telecommunications networks operating by wire or radio waves, as used for recording or transporting television signals, will be understood by reference to FIG. 15.

Figure 16:
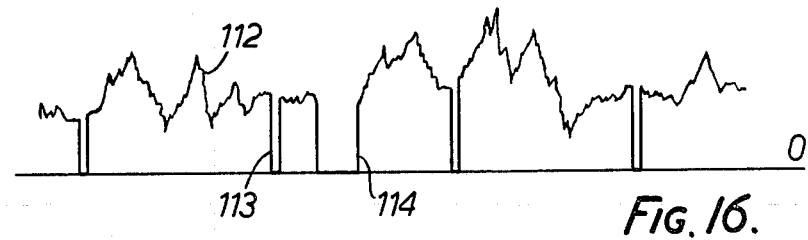
FIG. 16 is a partial representation of a multiplexed signal transmitted over the picture channel of a television transmission network.

FIG. 16 illustrates a portion of the multiplexed television signal in the form in which it is transported over the image channel of an existing radio system. This multiplexed signal comprises a combination of the video signal, the line synchronising pulses 113 and a frame synchronising pulse 114.

It will be seen that the composite video signal transmitted over the image channel must be constantly positive at the input of the radio system. This condition must be respected in order that the transmission may be correctly effected.

On comparison of FIG. 16 with FIG. 2, it will be seen that it is necessary to shift the mean level of the signals, that is to say, to add to the latter a positive d.c. voltage equal to the absolute value of the negative line and frame signals.

If this condition is satisfied, the composite video signals can be transmitted over the image channel of the radio systems and they can also be recorded on the image track of a television magnetoscope, whereby it is possible to provide all or some of the combinations illustrated in FIG. 15.

It is therefore sufficient to add to the radar signal multiplexing circuits which are illustrated in FIGS. 4 and 6 a positive bias voltage which is taken from a voltage divider in order to render the multiplexed signals compatible both with television magnetoscopes and with networks for the transport of television transmission which comprise two channels, a picture channel and a sound channel.

Figure 17:
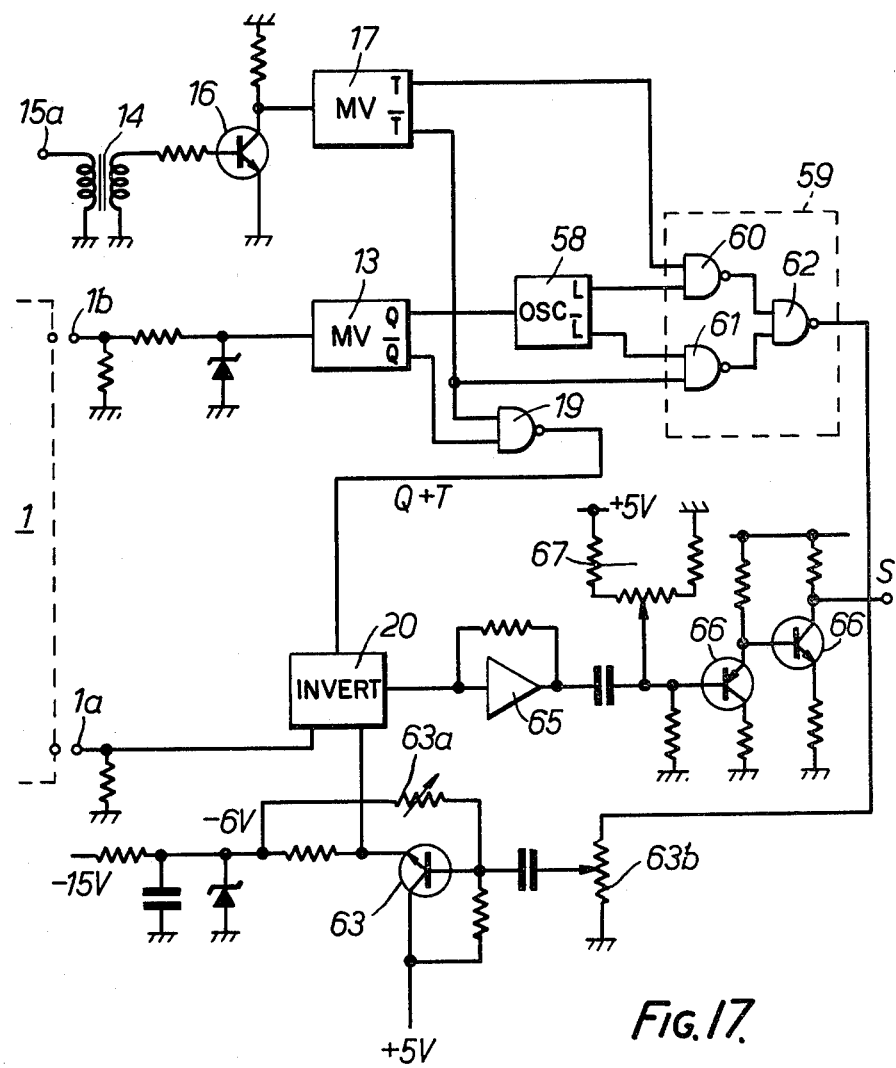
FIG. 17 is a developed diagram of an example of the construction of the radar video signal multiplexing circuits, showing the modification applied to the circuits illustrated in FIG. 11.

FIG. 17 illustrates by way of example the circuits according to FIG. 6, which supply the multiplexed signal at the output S. For a detailed explanation of this figure, reference should be made to the corresponding description of FIG. 6.

It will merely be recalled here that the radar station 1 has two outputs, an output 1a which supplies the video signals V and an output 1b which supplies the synchronising signals having a duration of the order of 1 μs.

There will also be seen an oscillator 14, for example a transformer, the primary winding of which is connected to an alternating-current network having a frequency of 50 Hz.

The monostable circuits 13 and 17 supply pulses $\overline{L}$ and $\overline{T}$, and the circuit 20 performs the multiplexing of the signals V, $\overline{L}$ and $\overline{T}$. The circuit 4 is an impedance and level matching circuit. There has been added to the circuit an adjustable voltage divider 67 by means of which a positive d.c. bias voltage equal to a fraction of +5 V can be added, so that the signal received at the output terminal 8 is constantly positive.

We claim:

1. Matching circuitry for use with a radar station and a television magnetoscope, the latter having a video channel and an audio channel, the matching circuitry being operable to supply to and retrieve from said television magnetoscope information provided by said radar station, said matching circuitry comprising:
   first means for supplying to said audio channel of said television magnetoscope information regarding the angular position of an antenna of said radar station;
   second means for supplying to said video channel of said television magnetoscope video signals and synchronising signals from said radar station;
   an oscillator for supplying for said video channel pulses T having a duration and frequency substantially equal to television frame pulses;
   mixing means for mixing said pulses T for said video channel with said video signals and said synchronising signals so that said pulses T will be recorded on a control track of said magnetoscope, said control track being intended for the recording of said television frame pulses, whereby said pulses T are employed during retrieval of said information from said magnetoscope for synchronising the speed of travel of a tape of said magnetoscope with the speed of revolution of a video signal reading head thereof;
   first retrieval means for retrieving said information from said video channel of said television magnetoscope;
   suppression means in said first retrieval means for suppressing said pulses T in the retrieval of said information; and
   second retrieval means for retrieving said information from said audio channel of said television magnetoscope.

2. Matching circuitry as claimed in claim 1, wherein said oscillator is a 50 or 60 Hz oscillator.

3. Matching circuitry as claimed in claim 1, wherein said first means is such as to produce for said magnetoscope a pulse N corresponding to each passage of said antenna through a reference orientation, and further pulses θ the number of which succeeding each pulse N is proportional at any instant to the angle of said antenna with respect to said reference orientation.

4. Matching circuitry as claimed in claim 3, wherein said first means include pulse coding means comprising a first pulse producing means to produce said pulses N, each pulse comprising n component pulses, when said antenna passes through said reference orientation, and second pulse producing means to produce said pulses θ, each such pulse comprising a different number n' of component pulses, the number of which pulses θ succeeding each pulse N is proportional at any instant to the angle of said antenna with respect to said reference direction, and wherein said second retrieval means comprises comparison means to identify said pulses N and θ by counting the number of component pulses, and conversion means for converting the number of identified pulses θ into three three-phase voltages which define at any instant said angle of said antenna with respect to said reference orientation.

5. Matching circuitry as claimed in claim 1, wherein said second means comprise biassing means for providing that in said mixing means said pulses T and said synchronising signals have a negative amplitude, and wherein said first retrieval means comprises negative signal detection means for detecting said pulses T and said synchronising signals, and separating means for separating said synchronising signals.

6. Matching circuitry as claimed in claim 5, wherein said second means comprise conversion means for converting said synchronising signals into pulse trains of a number m of successive pulses, and said separating means comprises counting means for separating said synchronising signals by comparing the number of successive pulses in a signal in a limited time with a number m' lower than or equal to m.

7. Matching circuitry as claimed in claim 5, wherein said separating means is followed by means for generating from said synchronising signals radar synchronising pulses having a duration of the order of 1 μs.

8. Matching circuitry as claimed in claim 6, wherein said pulse trains comprise pulses having a duration of 6 μs equal to the duration of television line synchronisiing pulses, and said pulses T have a duration of 120 μs.

9. Matching circuitry as claimed in claim 1, wherein said first means comprise a synchro-digital converter for converting analog voltages emitted by a receiver synchro of said radar station into digital values proportional at any instant to the angular position of said antenna.

10. Matching circuitry according to claim 3, wherein said second retrieval means comprise a binary pulse counter arranged to count said pulses θ and to be reset by a pulse N, and a digital-synchro converter coupled to said binary pulse counter to supply three-phase voltages which define at any instant an angle equal to said angle of said antenna with respect to said reference orientation.

11. Matching circuitry as claimed in claim 9, wherein said first means comprise:
   a first flip-flop which is connected to output terminal $2^o$, the most significant bit of said synchro-digital converter;
   an oscillator and a second flip-flop which are connected to the output terminal $2^{-n}$, the least significant bit of said synchro-digital converter;
   a logic AND gate having two inputs which are connected respectively to the output of the said oscillator and to the output Q of the said second flip-flop;
   a binary pulse counter of which the input is connected to the output of the said AND gate and of which the resetting terminal is connected to the output Q of the said second flip-flop; and
   a logic circuit formed of three NAND gates each having two inputs, a first gate of which the two inputs are connected respectively to the output terminals $2^2$ and $2^3$ of said counter, a second gate whose two inputs are connected respectively to the output of the first gate and to the positive output of the said first flip-flop, and a third gate of which the two inputs are connected respectively to the output of the second gate and to the $2^3$ output terminal of the said counter, the output of the said third AND gate being connected to the resetting terminals of said first and second flip-flops and the output of the AND gate being for connection by way of a level shifting circuit and of a matching circuit to an audio terminal of the magnetoscope.

12. Matching circuitry as claimed in claim 1, wherein said second retrieval means comprise:
   a circuit for shaping the signals leaving the audio head of the magnetoscope;
   a binary pulse counter of which the input is connected to the output of the said shaping circuit;
   a logic NAND gate having two inputs, of which the output is connected to a monostable multivibrator, of which a first input is connected to the output of the said shaping circuit and of which the second input is connected to the output Q of the said monostable multivibrator;
   an inverter whose input is connected to the output of the said NAND gate and of which the output is connected to the resetting terminal of the said counter;
   an AND gate having two inputs which are connected to the $2^2$ and $2^3$ output terminal of said counter; and
   a second binary pulse counter whose input is connected to the $2^3$ output terminal of said counter and of which the resetting terminal is connected to the output of the AND gate.

13. Matching circuitry as claimed in claim 1, wherein said second means comprise:
   a first monostable multivibrator having a triggering duration of the order of 6 $\mu$s, which is connected to the output terminal for the advanced synchronisation pulses of the radar and which supply pulses Q and $\bar{Q}$;
   an oscillator which is connected to the output Q of the said monostable multivibrator and which supplies trains of at least four pulses L and $\bar{L}$;
   a coupling transformer whose primary winding is connected to an oscillator having a frequency of 50 Hz or 60 Hz and whose secondary winding is connected to a second monostable multivibrator which supplies pulses T and $\bar{T}$ having a duration of the order of 120 $\mu$s;
   an OR gate which is connected to the outputs Q of the first and second monostable multivibrators;
   an integrated circuit which is equivalent to three NAND gates of which the inputs are connected to the outputs of the oscillator and of the second monostable multivibrator and which forms a logic signal equal to $(L \cdot T) + L + T$;
   a circuit for the downward shifting of the mean level of the signal $L \cdot T + L + T$ which is connected to the output of the said integrated circuit and which supplies a signal $(L' \cdot T') + L' + T'$;
   a double analog inverter which comprises two controlled contacts, one of which is open and the other closed, and which are connected to the output of the said OR gate and controlled by the level of the said output, a first contact which is for connection to the video output of the radar and a second contact which is connected to the output of the said shifting circuit so that the said double inverter supplies the video signal when there are no synchronising or frame pulses ($Q + T = 0$) and a signal equal to $L' \cdot T' + (L' + T')$ when there are synchronising or frame pulses ($Q + T = 1$).

14. Matching circuitry as claimed in claim 13, wherein said first retrieval means comprise:
   a first circuit which supplies the radar video signals and which comprises, connected in series, a circuit for fixing the continuous level of the signals, a circuit for clipping the bottom of the signal, which stops all the negative signals, an amplifier and a level and impedance matching circuit;
   a second circuit which supplies the radar synchronising pulses and which comprises a low-pass filter, an amplifier, a threshold detector which compares the level of the signals with a negative threshold and which passes only the negative signals L' and T';
   an inverter and a logic NAND gate, of which one input is connected to the output of the said inverter;
   a monostable multivibrator whose triggering duration is slightly greater than that of the pulse trains L and whose output Q is connected to the second input of the said gate;
   a binary counter, of which the input is connected to the output of the gate by way of an inverter and of which the resetting terminal is connected to the output of the said inverter; and
   two circuits connected to the $2^2$ output terminal of the counter, a first circuit which supplies the advanced radar synchronising pulses and which comprises in series a monostable multivibrator having a triggering duration of the order of 1 $\mu$s and a matching circuit and a second circuit supplying the radar synchronising pulses which comprises, in series, a delay circuit having an adjustable delay between 1 $\mu$s and 10 $\mu$s, a monostable multivibrator having a triggering duration of the order of 1 $\mu$s and a matching circuit.

15. Matching circuitry as claimed in claim 1, when applied to the transmission processing at a distance of the signals emitted by a radar station over a television transmission network comprising a picture channel and a second channel, wherein said first means, said second means, said oscillator and said mixing means are interposed between the output of said radar station and a transmitter of said network, and said first and second retrieval means are interposed between a receiver of said network and apparatus, remote from said radar station, for processing the radar signals.

16. Matching circuitry as claimed in claim 15, wherein said mixing means comprise circuits for mixing with the radar video signals both radar synchronising pulses and negative pulses T' generated by means of an independent oscillator, and said mixing means comprise means for raising the mean level of the multiplexed signals in such manner that these signals are constantly positive.

17. Matching circuitry as claimed in claim 16, wherein said raising means consist of a decoupling capacitor and an adjustable voltage divider.

18. Method of recording on a commercial television magnetoscope, having only two T.V. picture and sound channels or paths, information emitted by a radar station and for retrieving or reproducing such information of the type in which the information regarding the angular position of the antenna of the radar station is recorded on that one of the tracks of the magnetoscope which is used for the recording of the television sound, on the one hand, and the video signals and the synchronising pulses of the radar station are recorded on that track of the magnetoscope which is intended for the recording of the video signals and of the line and frame synchronising signals of the television, the said method being characterised in that there are produced from a 50 or 60 Hz oscillator pulses T having the duration and the frequency of the television framepulses, these pulses are mixed with the radar video signals and with the radar synchronising pulses before they are directed to the input of the magnetoscope, so that these pulses T are recorded on the magnetoscope control track which is intended for the recording of the television frame pulses, and they are used during the retrieval or reproduction for synchronising the speed of travel of the tape of the magnetoscope with the speed of rotation of the head for the reading of the video signals, and the said pulses T are thereafter suppressed in the retrieval or reproduction circuits.

19. Apparatus for carrying out a method according to claim 18 for recording on the video track of a television magnetoscope the radar video signals and the radar synchronising pulses and for recording on an audio track of the magnetoscope the angular position of the antenna of the radar station in relation to a fixed reference direction, the said position being represented in analog form by voltages which are emitted by a synchro-receiver forming part of the radar, which apparatus is characterised in that it comprises matching circuits interposed between the radar and the magnetoscope, the said circuits comprising:

circuits for mixing with the radar video signals, simultaneously, negative pulses L' synchronous with the said radar synchronising pulses having a duration of 6 $\mu s$ equal to the duration of the television line synchronising pulses, and negative pulses T having a duration of 120 $\mu s$ equal to the duration of the television frame pulses, the said pulses T' being generated by means of an oscillator having a frequency of 50 or 60 Hz equal to the standardised frequency of the television frame pulses, which circuits are connected to the video input terminal of the magnetoscope;

a synchro-digital converter for converting the voltages emitted by the said synchroreceiver into digital values proportional at any instant to the angular position of the antenna in relation to the said reference direction;

circuits which are connected to the least and most significant output terminals, $2^0$, $2^{-n}$, of the said synchro-digital convertor and which generate on the one hand a pulse N corresponding to each passage of the antenna through the said reference direction and on the other hand pulses $\theta$ of which the number succeeding each pulse N is proportional at any instant to the said angular position of the antenna, which circuits are connected to the audio input terminal of the magnetoscope.

20. Apparatus for reading the information recorded on a television magnetoscope by means of an apparatus according to claim 19 and for reproducing them in utilisation circuits in their original form, characterised in that it comprises matching circuits interposed between the outputs of the magnetoscope and the said circuits for the utilisation of the radar information, which matching circuits comprise:

circuits connected to that output terminal of the magnetoscope which corresponds to the head for the reading of the video signals, the said circuits comprising on the one hand means for eliminating all the negative signals so as to separate the video signals, and on the other hand means for eliminating the video signals and the said pulses T so as to supply only the pulses L, and means for generating from the said pulses L radar synchronising pulses having a duration of the order of 1 $\mu s$;

circuits connected to an output terminal of the magnetoscope corresponding to an audio reading head, the said circuits comprising circuits for separating the said pulses N and $\theta$, a binary pulse counter whose resulting terminal is connected to the output of the said circuits which supply the pulses N and of which the input is connected to the output of the said circuits which supply the pulses $\theta$, and a digital-synchro convertor which supplies three-phase pulses which define at any instant an angle equal to the angular position of the antenna in relation to the said fixed reference direction.

* * * * *